United States Patent [19]
Dutkiewicz et al.

[11] Patent Number: 5,890,057
[45] Date of Patent: Mar. 30, 1999

[54] MODULATION SIGNAL CALIBRATION BETWEEN MODEM AND RADIO USING LOOPBACK

[75] Inventors: Marek Dutkiewicz, Delta; J. F. Denis Beaudoin; Ronald John Vanderhelm, both of Surrey, all of Canada

[73] Assignee: Sierra Wireless, Inc., Canada

[21] Appl. No.: 757,424

[22] Filed: Nov. 27, 1996

[51] Int. Cl.[6] ..................................................... H04B 1/38
[52] U.S. Cl. ........................ 455/69; 455/67.1; 455/226.1; 375/220
[58] Field of Search ................................ 455/67.1, 67.3, 455/67.4, 68, 69, 70, 71, 226.1, 226.2, 227, 234.1, 245.1; 375/220, 231, 271, 285, 316, 345

[56] References Cited

U.S. PATENT DOCUMENTS

| | | | |
|---|---|---|---|
| 3,195,047 | 7/1965 | Ruthroff | 455/44 |
| 4,222,118 | 9/1980 | Dickinson et al. | 455/70 |
| 4,581,749 | 4/1986 | Carney et al. | 375/302 |
| 4,637,064 | 1/1987 | Roberts et al. | 455/67.4 |
| 4,890,332 | 12/1989 | Takahashi | 455/67.3 |
| 4,910,791 | 3/1990 | Dickinson et al. | 455/67.4 |
| 5,408,695 | 4/1995 | Dorr | 455/226.1 |
| 5,511,069 | 4/1996 | England et al. | 370/276 |
| 5,734,676 | 3/1998 | Dingsor | 375/222 |
| 5,751,114 | 5/1998 | Dingsor | 375/222 |
| 5,761,259 | 6/1998 | Dingsor | 375/285 |

FOREIGN PATENT DOCUMENTS

| | | |
|---|---|---|
| 57 046579 | 3/1982 | Japan . |
| 2 283 629 | 5/1995 | United Kingdom . |
| 2 285 558 A | 7/1995 | United Kingdom . |
| 94 29968 A | 12/1994 | WIPO . |

*Primary Examiner*—Willis R. Wolfe
*Assistant Examiner*—Hieu T. Vo
*Attorney, Agent, or Firm*—Burns, Doane, Swecker & Mathis LLP

[57] ABSTRACT

A radio-frequency output signal having a specified characteristic is produced using a combination of a calibrated radio unit in which a calibration factor is stored and an uncalibrated modem unit. The calibration factor is input to the modem unit from the radio unit, and the modem outputs to the radio unit a signal of a nominal signal level determined in accordance with the calibration factor. An actual signal level of the signal is measured, and a gain factor within the modem unit is adjusted until the nominal signal level and the actual signal level are substantially equal. A wireless modem includes a calibrated radio unit and an uncalibrated modem unit coupled to the radio unit. A first signal path is provided from the modem unit to the radio unit, and a feedback signal path from the radio unit to the modem unit. The modem unit includes control circuitry for outputting across the first signal path a signal that is nominally of a desired signal level, and for adjusting a nominal signal level of the signal in accordance with information received across the feedback signal path.

12 Claims, 5 Drawing Sheets

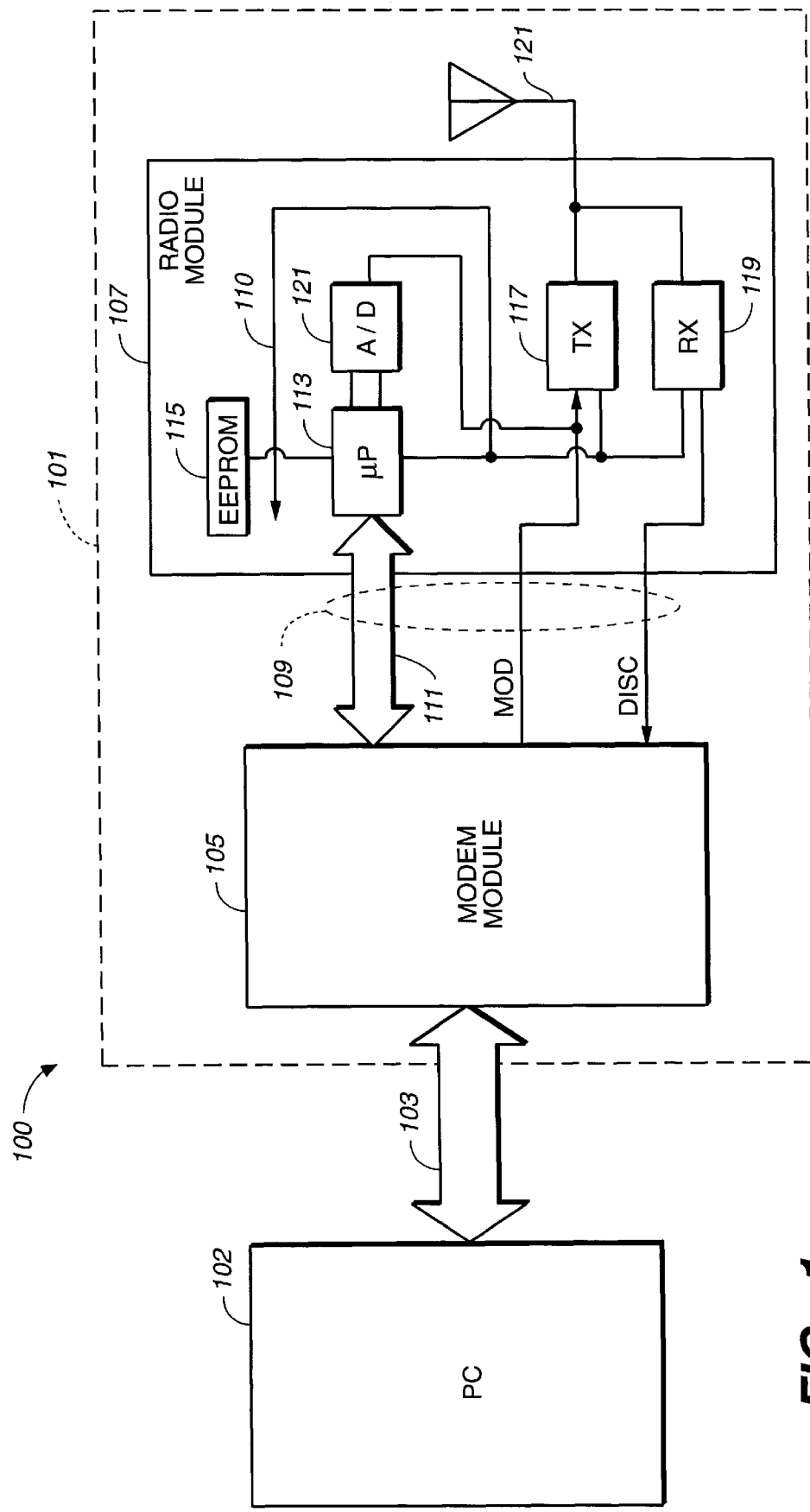
FIG._1

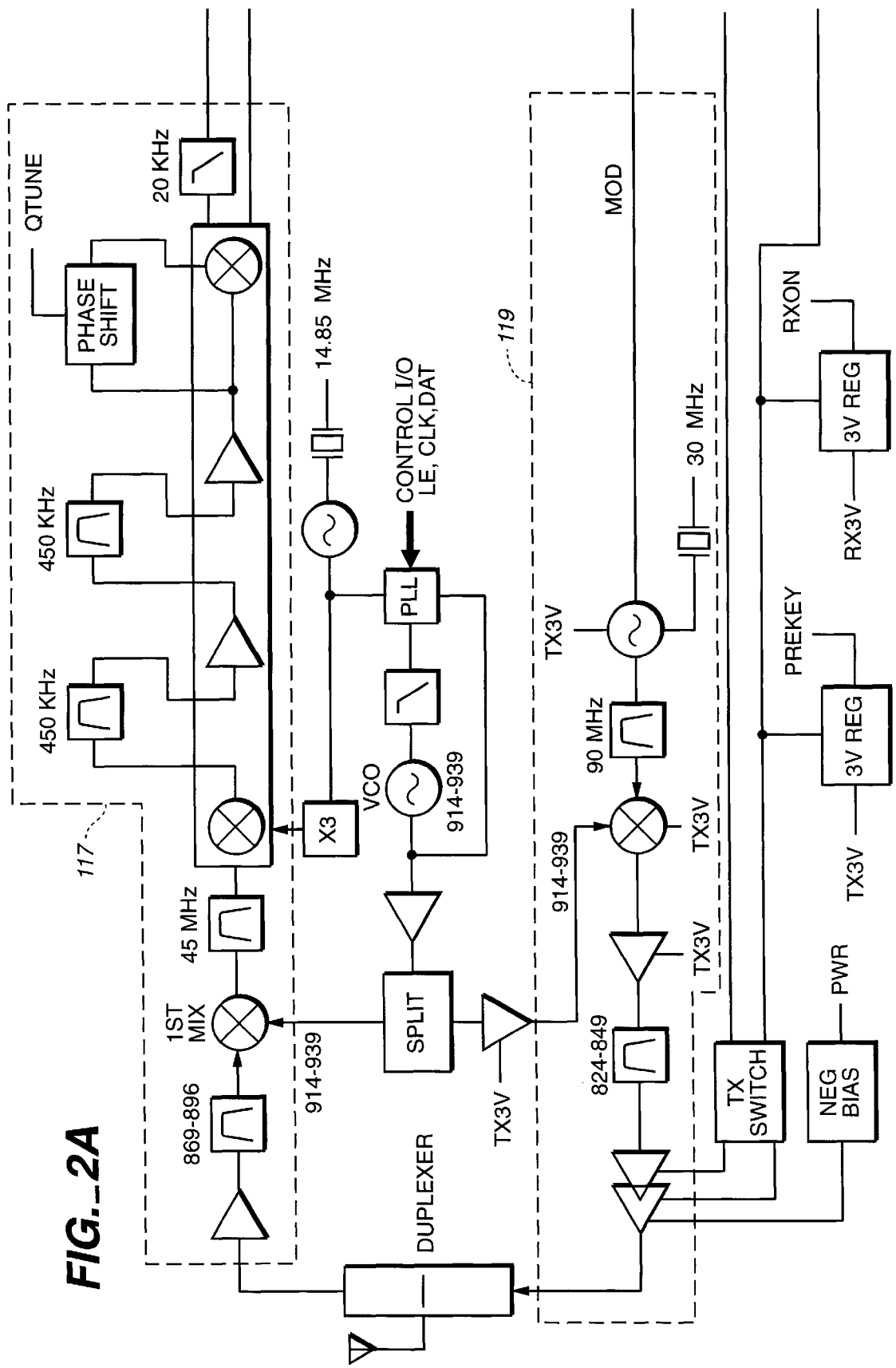
FIG._2A

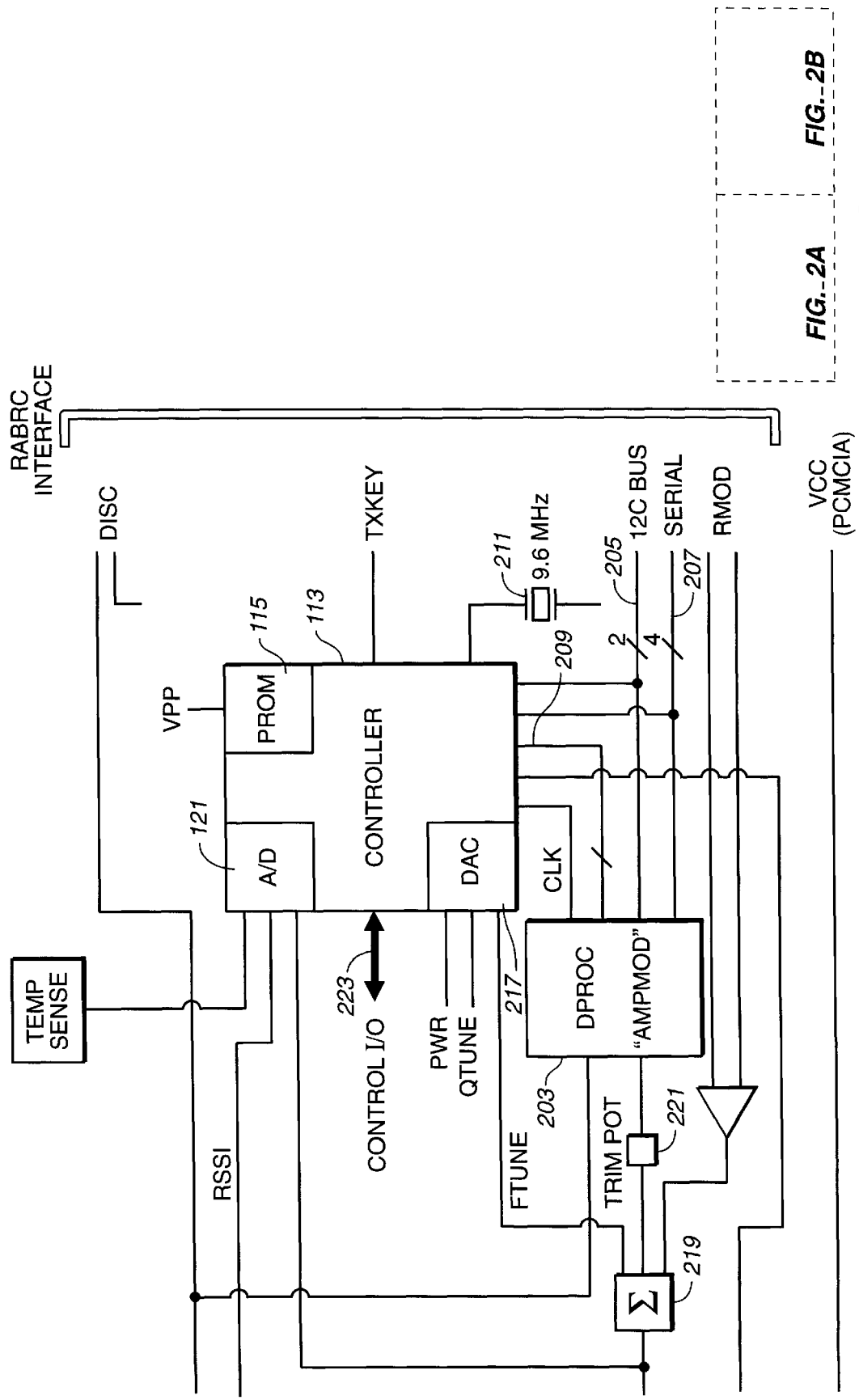

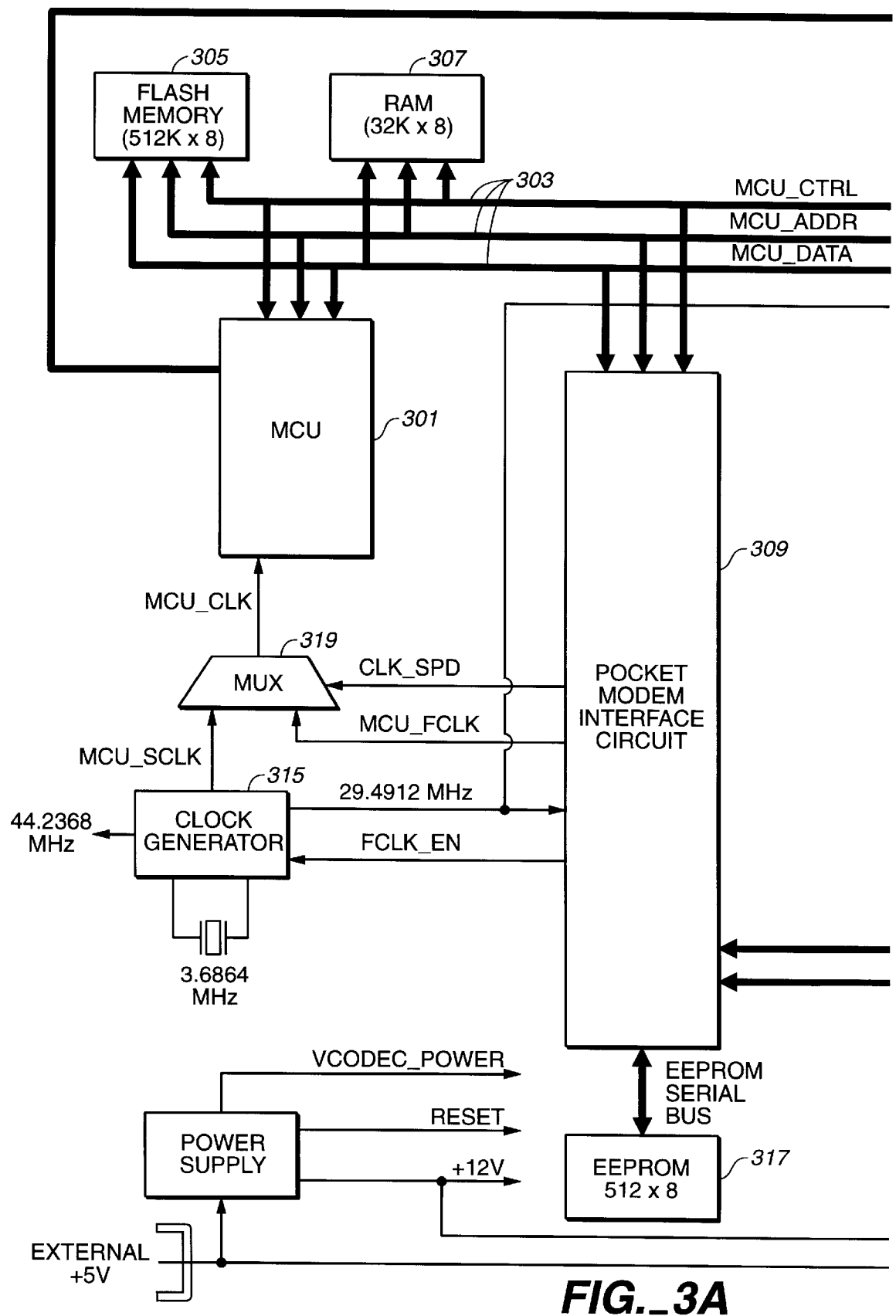
FIG._3A

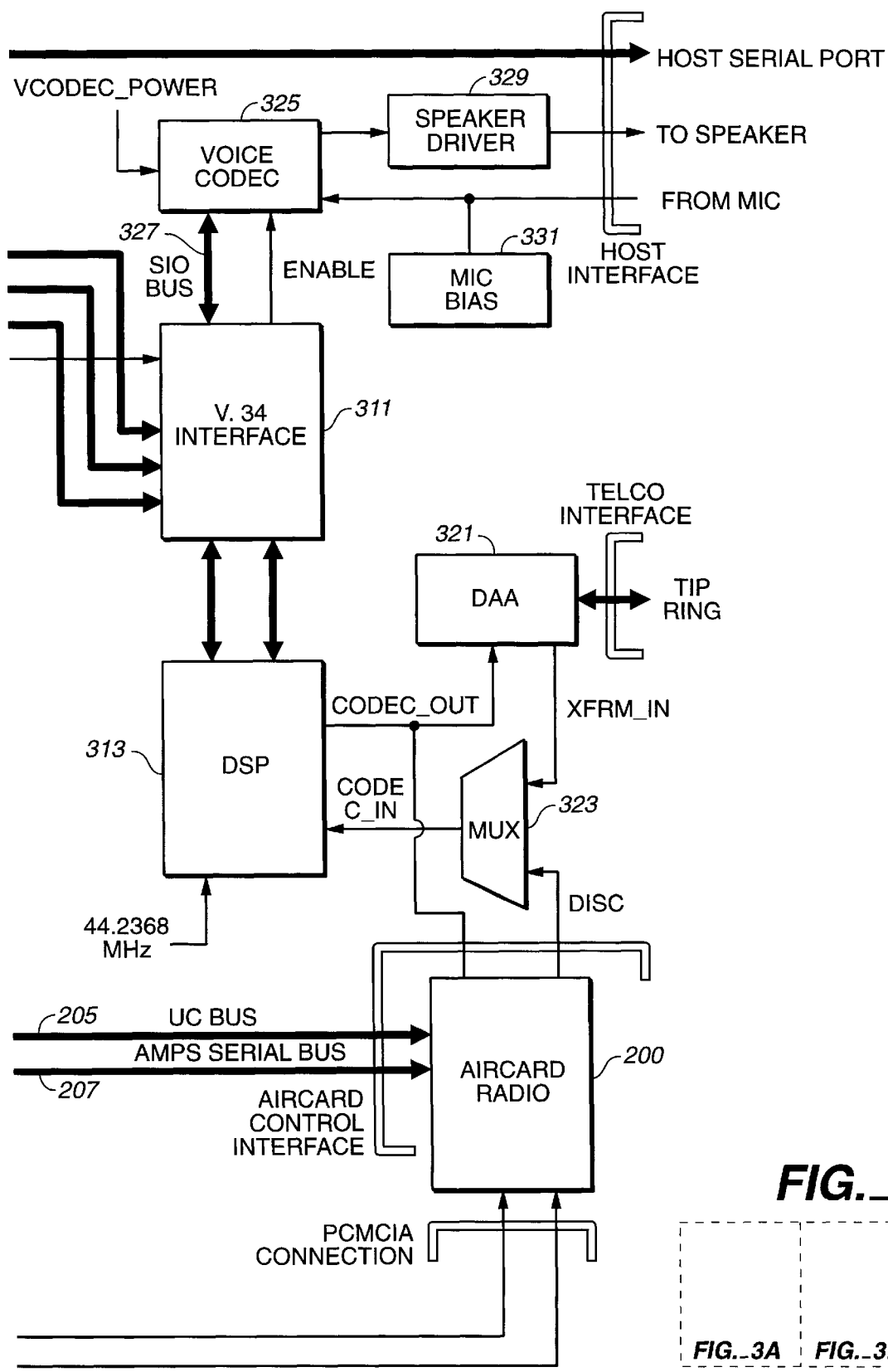
FIG._3B

MODULATION SIGNAL CALIBRATION BETWEEN MODEM AND RADIO USING LOOPBACK

BACKGROUND OF THE INVENTION

1. Field of the Invention

The present invention relates to calibration of wireless modems.

2. State of the Art

Wireless data and voice connectivity is increasingly in demand. Wireless data connectivity is typically achieved using a wireless modem/radio combination. This combination is often referred to generically as a wireless modem.

Wireless modems exist for various radio transmissions standards. One such standard is the CDPD, or Cellular Digital Packet Data, standard. The CDPD service is implemented as an overlay on top of the AMPS, or Advanced Mobile Phone System, standard for cellular telephone communications.

Various advantages may be achieved by realizing a wireless modem as a separable modem and separable mobile radio device. Both the mobile radio device and the modem may be realized in the form of PC Cards as described in greater detail in U.S. patent application Ser. No. 08/724,459 (Attorney's Docket No. 024938-025) entitled TWO-PIECE PCMCIA MULTI-MODE WIRELESS MODEM, filed on Oct. 1, 1996, still pending, and incorporated herein by reference.

Although many advantages accrue as a result of the separation of radio and modem as described in the aforementioned application, the radio and modem must nevertheless operate in a well-coordinated manner in order to ensure compliance with the applicable radio transmission standard. In the case of the CDPD standard, which uses frequency modulation, the specification for modulation deviation is quite stringent. Modulation deviation refers to the deviation in frequency of the transmitted signal between when a logic 1 is being transmitted and when a logic zero is being transmitted. If the standard for modulation deviation is not strictly adhered to, then transmissions by the radio may not be correctly received.

Modulation deviation is determined by the combined operation of the modem and radio. In particular, the modem produces an analog modulation signal which is then applied to the radio. In response to this modulation signal, the radio varies the modulation deviation of the transmitted signal.

Because of variations in the manufacturing process, each radio exhibits a slightly different sensitivity, measured in volts/kilohertz, to the modulation signal input from the modem. For example, if the radio transmission standard calls for a deviation of 4.8 kHz (±5%), one radio may give the required deviation in response to a modulation signal of 1.0V, and the next radio may give the required deviation in response to a modulation signal of 0.94V. However the modem is likewise subject to manufacturing variations. Hence, while the modem may be outputting a modulation signal that is nominally 1.0V peak-to-peak, in actuality, the modulation signal may be 1.1V peak-to-peak.

In the prior art, because most wireless modems are integrated combinations in which the modem and radio are not separable, the foregoing difficulty is easily overcome by performing a single factory calibration on the unit. As a result of the calibration operation, a calibration factor is then stored in non-volatile memory within the unit. During power-up initialization of the unit, this calibration factor is retrieved and used in order to achieve the proper modulation deviation.

In the case of a two-piece wireless modem of the type aforementioned, although the same type of calibration procedure may be applied to the combination of a particular modem and radio, requiring that the particular modem and radio always be paired together would defeat the purpose of separating the modem and radio and would negate the advantages that accrue from such separation. Of course, once the modem and radio are separated and paired with another modem or radio, as the case may be, the calibration results obtained from the original pairing are no longer valid.

One solution would be to separately and individually calibrate all modems and all radios. The cost of calibration, however, is high. One minute of test time may cost as much as the production cost of an entire modem. What is needed, then, is a calibration mechanism that allows a relatively stringent radio transmission standard to be reliably met, without requiring all modems and all radios to be separately and individually calibrated. The present invention addresses this need.

SUMMARY OF THE INVENTION

The present invention, generally speaking, allows a radio-frequency output signal having a specified characteristic to be produced using a combination of a calibrated radio unit in which a calibration factor is stored and an uncalibrated modem unit. In accordance with one aspect of the invention, the calibration factor is input to the modem unit from the radio unit, and the modem outputs to the radio unit a signal of a nominal signal level determined in accordance with the calibration factor. An actual signal level of the signal is measured, and a gain factor within the modem unit is adjusted until the nominal signal level and the actual signal level are substantially equal. In accordance with another aspect of the invention, a wireless modem includes a calibrated radio unit and an uncalibrated modem unit coupled to the radio unit. A first signal path is provided from the modem unit to the radio unit, and a feedback signal path is provided from the radio unit to the modem unit. The modem unit includes control circuity for outputting across the first signal path a signal that is nominally of a desired signal level, and for adjusting a nominal signal level of the signal in accordance with information received across the feedback signal path. Other aspects of the invention will appear from the appended claims.

BRIEF DESCRIPTION OF THE DRAWING

The present invention may be further understood from the following description in conjunction with the appended drawing. In the drawing:

FIG. 1 is a block diagram of a computer system in which the present invention may be used;

FIGS. 2, 2A and 2B are more detailed block diagram of the radio of FIG. 1; and

FIGS. 3, 3A and 3B are more detailed block diagram of the modem of FIG. 1.

DETAILED DESCRIPTION OF THE PREFERRED EMBODIMENTS

Referring now to FIG. 1, there is shown a block diagram of a computer system 100 in which the present invention may be used. A wireless modem 101 is coupled to a computer 102 such as a PC by means of an interface bus 103. The interface bus 103 may be of a type specified in the PC Card specification, for example.

The wireless modem 101 includes a modem module 105 and a radio module 107, each of which is separable from the other. In an exemplary embodiment, both the modem module 105 and the radio module 107 may be constituted as PC Cards. Further according to an exemplary embodiment, the modem module 105 and the radio module 107 interface to one another through a cable 109 external to the computer 102. The cable may include a general-purpose bus 111, a discriminator (DISC) signal from the radio module 107 to the modem module 105, and a modulation (MOD) signal from the modem module 105 to the radio module 107.

The internal configuration of the radio module 107 is shown in FIG. 1 in generalized block diagram form. The radio module 107 is controlled by a microprocessor/microcontroller 113. General-purpose communications between the radio module 107 and the modem module 105 are handled by the microprocessor 113 and occur across the general-purpose bus 111, to which the microprocessor 113 is coupled. The microprocessor 113 is also coupled to a EEPROM memory 115 in which calibration information is stored.

A transmitter section 117 and a receiver section 119 are coupled to a common antenna 121. The transmitter section 117 receives the MOD signal from the modem module 107 and uses the MOD signal to modulate a signal to be transmitted so as to communicate data. The receiver section 119 receives a modulated signal and in response thereto produces the DISC signal which is output to the modem module 105. Both the transmitter section 117 and the receiver section 119 receive control signals from the microprocessor 113.

Of particular importance to the present invention is a feedback path 110 within the radio module 107 that is used to produce a digital value indicative of the level of the MOD signal and to feed this digital value back to the modem module 105. More particularly, the MOD signal, besides being coupled to the transmitter section 117, is additionally coupled to an A/D converter 121. The A/D converter is coupled in turn to the microprocessor 113.

In operation, at start-up, the modem module 105 interrogates the radio module 107 for a stored calibration value that relates the signal deviation produced by the radio module 105 to the signal level of the MOD signal applied to the radio module 105. The calibration value may have units of volts/kilohertz deviation, for example. Based on this value, the modem module 105 then outputs a MOD signal calculated to achieve the appropriate deviation based on the applicable radio transmission standard. In the case of the CDPD standard, the required deviation is 4.8 kHz (±5%).

The modem module 105, however, is uncalibrated. Therefore, whereas the nominal signal level of the MOD signal may be precisely the required value according to logic within the modem module 105, the actual signal level of the MOD signal may be significantly different. The purpose of the feedback path 110 is to allow this difference to be detected. Accordingly, as the MOD signal is being applied to the radio module 107, the signal is converted to a digital value by the A/D converter 121.

The MOD signal is a time-varying signal the peak-to-peak value of which determines the deviation of the transmitted signal. The peak-to-peak value of the MOD signal may be determined from a series of measurements. This determination may be made either within the radio module 107 or within the modem module 105. Determining the peak-to-peak value within the radio module 107 has the advantage that a single resultant value may then be communicated to the modem module 105. The alternative is to communicate a series of values to the modem module 105 to enable the modem module to itself calculate the peak-to-peak value.

Based on the peak-to-peak value received from the radio module 107 or calculated within the modem module 105, the modem module then adjusts the DSP gain within the modem module 105 in order to produce a MOD signal of the appropriate level to yield the required deviation. This adjustment is a simple calculation. If the desired peak-to-peak value of the signal (per the stored calibration value) is X and the measured peak-to-peak value is 4, then an amplitude program value used within the modem DSP is multiplied by the ration X/Y.

An exemplary embodiment of the radio module 107 and of the modem module 105 will now be described in greater detail.

Referring to FIG. 2, the radio transceiver 107 of FIG. 1 is shown in greater detail. Of particular interest is a control portion of the radio transceiver. This portion of the transceiver receives commands from the host computer through the radio interface to control operation of the radio.

The control portion of the radio transceiver consists primarily of a microcontroller 113 and a data processor for cellular radio (DPROC) 203 such as the UMA1002 available from Philips Semiconductors. The microcontroller 113, in general, exercises overall control of the radio transceiver and its functions. The DPROC 203, in general, implements functions specific to AMPS. When protocols other than AMPS are used, such as CDPD, the DPROC is idle.

Both the microcontroller and the DPROC are connected to two different buses, a two-wire I²C bus 205 and a four-wire serial bus 207. The microcontroller 113 provides a clock signal to the DPROC and exchanges various control signals with the DPROC on a bus 209. A clock signal for the microcontroller 113 is provided by an oscillator 211.

The microcontroller includes a PROM 115, an A/D converter 121, and a D/A converter (DAC) 217. The PROM 115 receives a programming voltage VPP from the PCMCIA interface or the like. The A/D converter 121 is used to determine the values of various analog signals including the following: a temperature signal produced by a temperature sensor, a Received Signal Strength Indicator (RSSI), and a modulation feedback signal (MOD). The D/A converter 217 is used to produce various tuning and control voltages including the following: a power control voltage PWR used to control the transmit power of the radio, a voltage QTUNE used to adjust the center frequency of the demodulator within a receive section of the radio, and an FTUNE signal used to fine tune the center frequency within a transmit section of the radio. The signal FTUNE is combined in a summer 219 with the modulation signal RMOD from the baseband modem and a signal "AMPMOD" from the DPROC. The latter signal is attenuated by a trim pot 221 set during factory calibration to give the proper transmit deviation.

Only the principal inputs and outputs of the microcontroller necessary to a full and complete understanding of the present invention have been discussed. Other signals are exchanged between the microcontroller 113 and various other components within the radio as represented by the bus CONTROL I/O 223. In addition, a transmit keying signal TXKEY is input to the microcontroller.

The radio transceiver of FIG. 2 interfaces to a standard modem—either a modem PC Card or an internal modem—in a very similar fashion as a standard cellular phone in "Direct Connect" mode. 'Direct Connect' mode refers to the ability to connect directly from a modem to a cellular phone without the need for an intermediate interface box. Early modems had to connect to an interconnect box which performed whatever signal conditioning the phone required. Subsequently improvements resulted in building the appropriate hardware and software into the modem, facilitating a direct connection to the phone. Some of the functions normally performed within a cellular phone when that phone is being used for a data connection, however, are performed instead within the baseband modem. A specialized interface between the radio transceiver and the baseband modem is therefore required. The interface allows for AMPS data and voice communications and supports as well the CDPD protocol.

A block diagram of one possible modem architecture is shown in FIG. 3. A microprocessor control unit 301 is connected to a bus 303 including control, address and data portions. Also connected to the bus 303 are flash memory 305, random-access memory 307, a pocket modem interface circuit 309 and a V0.34 interface 311. The microprocessor control unit 301 exercises overall control of the modem, the pocket modem interface circuit 309 interfaces with the radio 200 via the buses 205 and 207 as previously described, and the V0.34 interface 311 interfaces with a DSP 313 to control modulation and demodulation of data.

A clock generator 315 provides a clock signal to the pocket modem interface circuit 309 and the V0.34 interface 311. The pocket modem interface circuit 309 is connected to an EEPROM memory 317. The pocket modem interface circuit 309 controls the clock speed of the MCU using a multiplexer 319.

In the illustrated embodiment, the modem may be operated in either wireless mode or wired mode. Hence the DSP produces a CODEC-OUT signal that is connected to both the radio 200 and to a DAA (Data Access Arrangement) 321. The DAA 321 is coupled to the telephone interface. A CODEC-IN signal of the DAA 321 is received from either the DAA 321 or the radio 200 through a multiplexer 323.

The V0.34 interface 311 includes voice capability. Digitized voice signals are therefore transmitted to and from voice codec 325 across a bus 327. The voice codec 325 is connected to a speaker driver 329 and to a microphone bias circuit 331.

The following components have been found to be suitable for use in modem of FIG. 3:

| Part | Mfgr. | Part No. |
| --- | --- | --- |
| Pocket Modem Interface Peripheral | Xilinx | XC33030A-70VQ100C |
| V.34 Interface ASIC | Lucent Tech. | VALV34-TQFP |
| Microprocessor control unit | Zilog | Z80182-16ASC |

It will be apparent to those of ordinary skill in the art that the invention can be embodied in other specific forms without departing from the spirit or essential character thereof. The foregoing description is therefore considered in all respects to be illustrative and not restrictive. The scope of the invention is indicated by the present claims rather than the foregoing description, and all changes which come within the meaning and range of equivalents thereof are intended to be embraced therein.

What is claimed is:

1. An uncalibrated modem unit for use with a calibrated radio unit, the modem unit comprising:

means for reading a calibration factor from the radio unit;

means for outputting a signal that is nominally of a desired signal level in accordance with said calibration factor;

means for receiving information indicative of an actual signal level of said signal; and means for adjusting a nominal signal level of said signal such that said actual signal level is more nearly equal to said desired signal level.

2. A calibrated radio unit for use with an uncalibrated modem unit, the radio unit comprising:

means for outputting a stored calibration factor;

means for determining an actual signal level of an input signal of the radio unit; and feedback means for outputting said actual signal level.

3. A wireless modem comprising:

a calibrated radio unit;

an uncalibrated modem unit coupled to the radio unit a first signal path from the modem unit to the radio unit; and a feedback signal path from the radio unit to the modem unit;

wherein the modem unit includes control means for outputting across said first signal path a signal that is nominally of a desired signal level, and for adjusting a nominal signal level of said signal in accordance with information received across said feedback signal path.

4. The wireless modem of claim 3, wherein the radio unit and the modem unit are each formed as separate PC Cards.

5. The wireless modem of claim 4, wherein the wireless modem operates in accordance with the CDPD radio transmission standard.

6. For use in a wireless modem, a method of producing a radio-frequency output signal having a specified characteristic using a combination of a calibrated radio unit in which a calibration factor is stored and an uncalibrated modem unit, the method comprising the steps of:

inputting to the modem unit from the radio unit said calibration factor;

outputting from the modem to the radio unit a signal of a nominal signal level determined in accordance with said calibration factor;

measuring an actual signal level of the signal; and adjusting a gain factor within the modem unit until the nominal signal level and the actual signal level are substantially equal.

7. The method of claim 6, wherein said signal is an analog signal and said measuring step comprises:

sampling said analog signal and converting a sampled value to a digital value.

8. The method of claim 7, wherein said measuring step further comprises:

repeating said sampling step to obtain a plurality of digital values; and computing a peak-to-peak signal level based on the plurality of digital values.

9. The method of claim 8, wherein said sampling step is performed within the radio unit.

10. The method of claim 9, wherein said computing step is performed within the radio unit, the method comprising the further step of communicating the peak-to-peak signal level from the radio unit to the modem unit.

11. The method of claim 8, comprising the further step of communicating the plurality of digital values from the radio unit to the modem unit.

12. The method of claim 11, wherein said computing step is performed within the modem unit.

* * * * *